Oct. 16, 1923.

G. JOHNSTON

REVOLVING SHUTTER FOR MOVING PICTURE PROJECTING MACHINES

Filed Dec. 18, 1920 — 2 Sheets-Sheet 1

1,471,031

WITNESSES

INVENTOR
Greenhow Johnston.
BY
ATTORNEYS

Oct. 16, 1923.
G. JOHNSTON
1,471,031
REVOLVING SHUTTER FOR MOVING PICTURE PROJECTING MACHINES
Filed Dec. 18, 1920  2 Sheets-Sheet 2
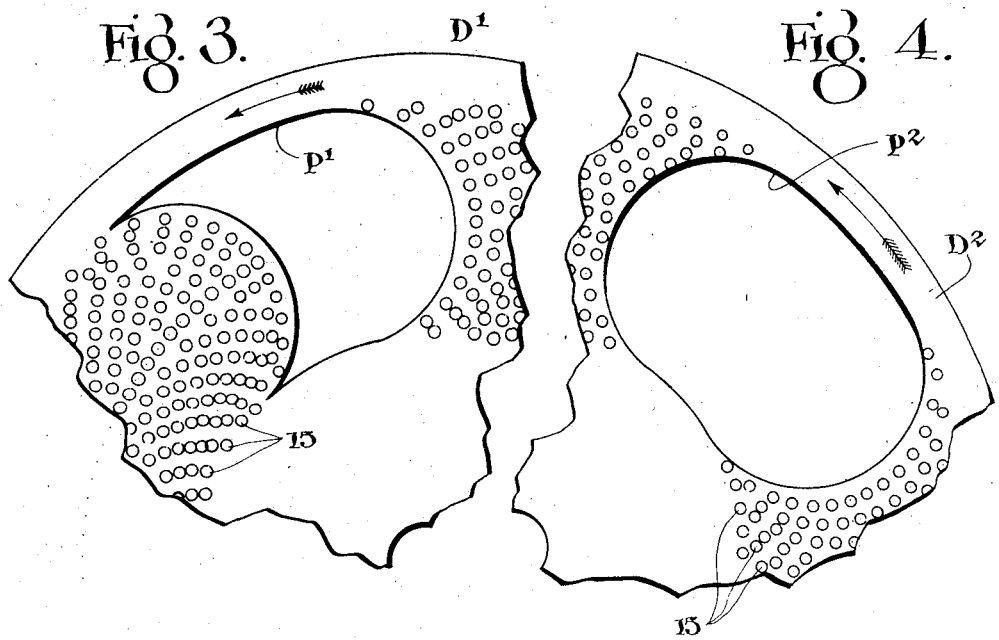
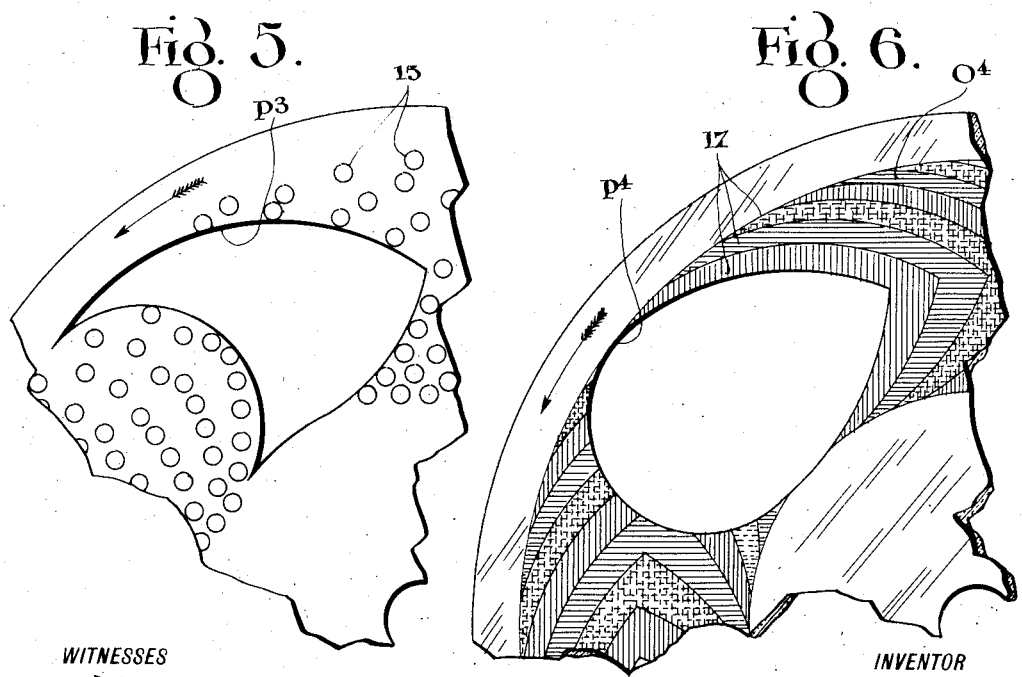
WITNESSES
INVENTOR
Greenhow Johnston.
BY
ATTORNEYS Patented Oct. 16, 1923.

1,471,031

UNITED STATES PATENT OFFICE.

GREENHOW JOHNSTON, OF RICHMOND, VIRGINIA.

REVOLVING SHUTTER FOR MOVING-PICTURE-PROJECTING MACHINES.

Application filed December 18, 1920. Serial No. 431,713.

*To all whom it may concern:*

Be it known that I, GREENHOW JOHNSTON, a citizen of the United States, and a resident of Richmond, in the county of Henrico and State of Virginia, have invented certain new and useful Improvements in Revolving Shutters for Moving-Picture-Projecting Machines, of which the following is a specification.

My invention relates to revolving shutters for moving picture projecting machines, and a purpose of my invention is the provision of a shutter which increases the amount of light reaching the screen, eliminates the flicker, and secures the desired colored effects on the screen without the necessity of coloring the film itself.

In carrying out my invention, I provide a shutter having projecting portions or openings therein of such form as to obtain a rapid and complete exposure of the lens opening, and an attenuated obscuration of the lens opening, the movement of the projecting portion across the lens opening being such as to expose and obscure the axis of the lens opening, which is the point of greatest light projection, first and last, thereby, greatly increasing the amount of light reaching the screen. In addition to the projecting portion, an obscuring portion is provided which may or may not be opaque to the projection of a picture but which is rendered transpicuous to the projection of light by means of transparent colored matter applied thereto, and in such manner as to cause a continuous transposition of color during rotation of the shutter. By virtue of this obscuring portion, the light projected upon the screen is diffused so as to reduce obscuration, thus tending to eliminate the flicker. The arrangement of the colored material with relation to the projecting portion is such as to effect a gradual blending of the colors into the projected images, which naturally tends to eliminate the flicker.

I will describe five forms of shutters embodying my invention and will then point out the novel features thereof in claims.

Figures 1, 2:
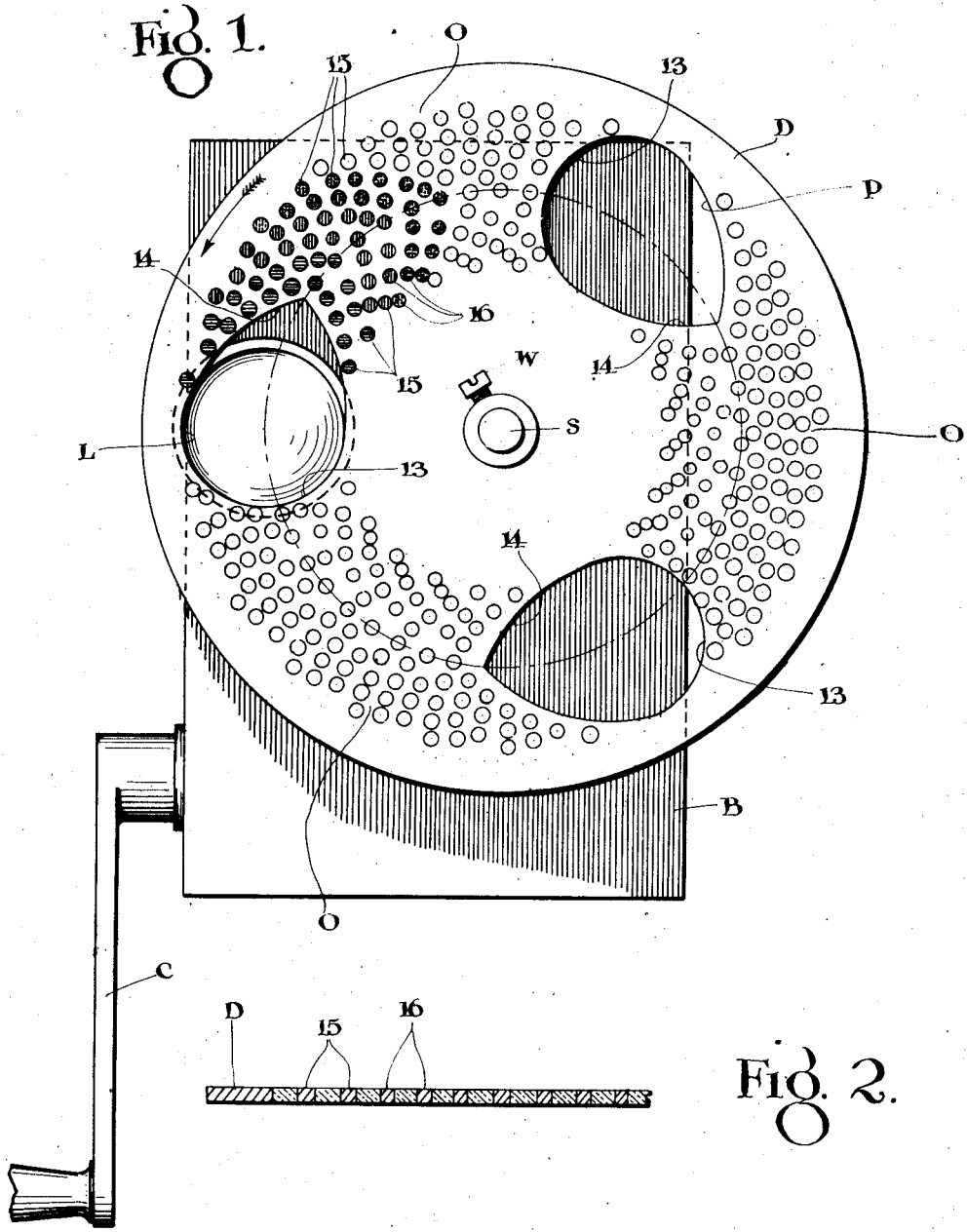
Figure 1 is a view showing in front elevation one form of shutter embodying my invention in applied position with respect to a projecting machine.
Figure 2 is a fragmentary transverse sectional view of the shutter shown in Figure 1.

Figures 3, 4, 5, and 6 are fragmentary views showing in side elevation other forms of shutters embodying my invention.

Similar reference characters refer to similar parts in each of the several views.

Referring specifically to the drawings and particularly to Figure 1, my invention in its present embodiment consists of a metal disc designated at D which is formed with one or more openings P constituting a projecting portion through which the pictures are adapted to be projected when the opening moves into registration with a lens opening. The shutter further includes one or more portions which comprises that part of the disc extending circumferentially from one end of the projecting portion to the other end, and which constitutes an obscuring portion O for the purpose of checking the projection of the pictures as will be readily understood by those skilled in the art. In the present instance I have shown a shutter comprised of three projecting portions P and three obscuring portions O. The projecting portions P are in the present instance of substantially ovate form in outline with the wide end 13 constituting the leading or exposing end of the portion, while the narrow end 14 constitutes the trailing or shutting end of the portion, it being understood that the shutter is adapted to rotate in a counter-clockwise direction as indicated by the arrow in Figure 1. As seen in Figure 1, the several projecting portions are so arranged one with respect to the other, that their longitudinal axes are intersected substantially throughout their entire length by a circle which is concentric to the axis of the disc. The circle is indicated in dot and dash lines in Figure 1.

The obscuring portions O are each formed with a plurality of transverse perforations 15 which are arranged in groups. The perforations of each group are arranged along the lines of converging arcs which are substantially parallel to the arcs describing the trailing end 14 of the corresponding projecting portion P. By this arrangement it will be seen that the apex of any group of perforations coincides with the apex of the trailing end of the corresponding projecting portion which, as a consequence disposes them on the circle shown in dot and dash lines. As will be seen in Figure 1, the perforations of any one obscuring portion are arranged in the manner just described from the trailing end 14 of the projecting portion next in advance of the obscuring portion to the leading end 13 of the projecting portion next in the rear.

Within these perforations 15, a specially prepared transparent material 16 is adapted to be deposited, the nature of the material being such as to adhere to the walls of the perforations and to thus be securely retained therein against displacement. This material 16 consists in the main of celluloid, and is adapted to be colored by the intermixing of coloring matter when the material is in a fluid state so that after it is deposited into the perforations and has hardened, a transparent window of a predetermined color is formed within each of the perforations. As indicated in Figure 1, the three primary colors, red, blue, and yellow, are preferably employed in coloring the material within the perforations, the arrangement of the colors being such that any two adjacent groups of perforations are formed with windows of the same color. The three primary colors are arranged in sets extending from one projecting portion to another and in such manner as to provide converging strips of colors. In the present instance, the windows colored blue in the first group are arranged adjacent to the trailing end of the corresponding projecting portion P, and following the blue windows are the red and yellow windows in the order named. Upon the completion of the first set or group of colors, a second set is formed of colors preferably arranged in the same sequence, although it is to be understood that the primary colors may be arranged in any manner desired without departing from the spirit of the invention.

In Figure 1 I have shown an ordinary cinematograph machine embodying therein a lens box B containing the feeding mechanism for the film which is operable by a crank C. Projecting through the forward side of the lens box is a shaft S to which is fixed the shutter by means of a set screw W. The lens box is provided with a lens opening L through which the pictures are adapted to be projected. The foregoing machine obviously forms no part of the present invention, and no particular construction thereof is essential to my invention.

With the machine in operation, the shutter is rotated through the medium of the shaft S so as to successively move the projecting portions P into registration with the lens opening L, while each obscuring portion O traverses the lens opening in the rear of the corresponding projecting portion. It is to be particularly noted that during rotation of the shutter, the longitudinal axes of both the projecting and obscuring portions intersect the longitudinal axis of the lens opening L. When any one of the several projecting portions traverses the lens opening L, the leading end thereof effects a quick or sudden exposure of the opening because the radius of the circle which the arc at the leading end describes is the same as that of the lens opening, and because of this particular curvature, an exposure of the lens opening occurs in such manner as to expose the longitudinal axis of the lens opening within the shortest possible time. As the projecting portion continues to traverse the lens opening, the trailing end of the projecting portion being tapered naturally tends to maintain the axis of the lens opening exposed until the final obscuring action of the shutter. It is in this manner that a prolonged exposure of the longitudinal axis of the lens opening is secured, and it is by virtue of this prolonged exposure that the amount of light reaching the screen is materially increased.

After any one projecting portion has traversed the lens opening, the corresponding obscuring portion now moves into the front of the lens opening, and because of the particular arrangement of the colored windows, it will be clear that the light now reaching the screen is diffused and the color of such light is continuously transposed throughout the length of the obscuring portion. The diffusion in the light without total obscuration naturally tends to reduce the flicker. The particular arrangement of the several windows and the colors of each window effects the gradual blending of these colors with the color normally projected onto the screen and which as a consequence reduces obscuration and thereby prevents the objectionable flicker.

Referring now to Figure 3, I have here shown a portion of a shutter consisting of a disc D' having one or more openings P' constituting projecting portions. Each opening is arranged in a manner similar to the opening P of the first form of shutter so that its longitudinal axis is adapted to intersect the longitudinal axis of the lens opening. The projecting portion P' has a convex leading end and a concave trailing end which describe arcs of a circle having the same radius as the lens opening L.

In Figure 4, I have shown a shutter comprising a disc $D^2$ formed with one or more openings $P^2$ which constitutes a projecting portion. The portion in this instance is of elongated form having rounded ends. In Figure 5, the obscuring portion $P^3$ is a combination of the leading end of the projecting portion shown in Figure 3 and the trailing portion of the projecting portion shown in Figure 1. In all three forms of shutters, the obscuring portion or portions are perforated and filled with colored material in the same manner as the perforations in the shutter shown in Figure 1. The perforations in each of the several shutters are arranged in groups or series which are parallel to the trailing end of the projecting portion so as to produce substantially the same effect with regard to the blending of the colors as in the first form of my invention.

Referring now to Figure 6, I have here shown the shutter constructed of glass or similar transparent material which is molded to provide one or more openings which constitutes a projecting portion $P^4$. In the present instance this projecting portion is of the same contour as the projecting portions shown in Figure 1, and such portion is similarly arranged so that its longitudinal axis is adapted to intersect the axis of the lens opening during rotation of the shutter.

To produce continuous transposition of color during the interval between the exposures, the obscuring portion, which is normally transparent, is rendered transpicuous only to the projection of light by painting the obscuring portion, designated at $O^4$, in stripes 17 which are disposed parallel to the trailing end of the projecting portion. As in the first form of my invention, the stripes are arranged in groups, each group containing the primary colors preferably in the sequence of blue, read, and yellow, and continuing in this order from the trailing end of the projecting portion to the leading end. Such an arrangement of the colored stripes produces the same effect as that described in connection with the colored windows of the perforations in the first form of my invention.

Although I have herein shown and described only five forms of shutters embodying my invention, it is to be understood that various changes and modifications may be made herein without departing from the spirit of the invention and the spirit and scope of the appended claims.

What I claim is:

1. A shutter for motion picture projecting machines having a projecting portion of ovate form, and an obscuring portion having the primary colors applied thereto in groups following the contour of said ovate portion throughout the area of such portion.

2. A shutter for motion picture projecting machines having a projecting portion, and a transparent obscuring portion having the primary colors applied thereto in groups, with the colors of each group extending to a circle which intersects the longitudinal axis of the projecting portion.

3. A shutter for motion picture projecting machines having a projecting portion of curved outline, and a transparent obscuring portion having the primary colors applied thereto in groups with the colors of each group extending in arcs to a circle which intersects the longitudinal axis of the projecting portion.

4. A shutter for motion picture projecting machines having a projecting portion of substantially ovate outline arranged with its longitudinal axis on a circle which is concentric to the axis of the shutter and which is adapted to intersect the longitudinal axis of the lens opening, and an obscuring portion having the primary colors applied thereto on lines which are substantially parallel to the arcs describing the apex of the projecting portion.

5. A shutter for moving picture projecting machines having a projecting opening of such contour that its leading end is of greater cross sectional area than its trailing end, and the longitudinal axis of the opening being adapted to be continuously intersected by the longitudinal axis of a lens opening.

6. A shutter for moving picture projecting machines having a projecting portion of substantially ovate contour.

7. A shutter for moving picture projecting machines having a projecting portion of substantially ovate contour, and so arranged that its longitudinal axis is adapted to intersect the longitudinal axis of a lens opening.

8. A shutter for moving picture projecting machines having a projecting portion of substantially ovate contour so arranged that its wide end constitutes the leading end, with its longitudinal axis so arranged as to be adapted to be intersected by the longitudinal axis of a lens opening.

9. A shutter for moving picture projecting machines having a projecting portion, and an obscuring portion formed with perforations which are arranged substantially parallel to the trailing end of the projecting portion, and transparent colored material within said perforations, said material being colored with the primary colors and arranged in successive groups.

10. A shutter for moving picture projecting machines having a projecting portion of elongated form arranged so that its longitudinal axis is adapted to intersect the longitudinal axis of a lens opening, and an obscuring portion formed with perforations arranged in groups with the perforations of each group disposed substantially in parallelism with the trailing end of the projecting portion, and transparent colored material disposed within said perforations.

GREENHOW JOHNSTON.